US000002048P2

(19) United States

(12) Statutory Invention Registration (10) Reg. No.: US H2048 H

Wan et al. (43) Published: Sep. 3, 2002

(54) NON-HYDROQUINONE PHOTOGRAPHIC DEVELOPER COMPOSITION WITH LITH QUALITY AND ITS METHOD OF USAGE

(75) Inventors: Haixing Wan, Mahwah; Diane Zhang, Edison; David Carlson, Harrison; Alan A. Bornstein, Westwood, all of NJ (US)

(73) Assignee: Fuji Hunt Photographic Chemicals, Inc., Allendale, NJ (US)

(21) Appl. No.: 08/388,600

(22) Filed: Feb. 14, 1995

Related U.S. Application Data

(63) Continuation-in-part of application No. 08/078,024, filed on Jun. 18, 1993, now abandoned.

(51) Int. Cl.[7] ..... G03C 5/18; G03C 5/26

(52) U.S. Cl. ..... 430/480; 430/464; 430/478; 430/482; 430/483; 430/486

(58) Field of Search ..... 430/464, 478, 430/480, 482, 483, 486

(56) References Cited

U.S. PATENT DOCUMENTS 4,269,929 A 5/1981 Nothnagle ..... 430/264

(List continued on next page.)

FOREIGN PATENT DOCUMENTS

| | | |
|---|---|---|
| EP | 0531582 | 3/1993 |
| EP | 603586 | 6/1994 |
| GB | 767700 | 2/1957 |
| WO | 9311456 | 6/1993 |

OTHER PUBLICATIONS

RTECS No. KK0525000 for Butyldiethanolamine, National Institute of Occupational Safety and Health, Jan. 1993, Department of Health and Human Services (Cincinnati, OH).

(List continued on next page.)

*Primary Examiner*—Peter M. Poon
*Assistant Examiner*—Aileen J. Baker
(74) *Attorney, Agent, or Firm*—Sughrue Mion, PLLC

(57) ABSTRACT

A non-hydroquinone photographic developer composition comprising:

(a) a developer selected from the group consisting of ascorbic acid and sugar-type derivatives thereof, or alkali metal salts and mixtures thereof, in an amount of 0.1 to 0.4 mol/liter (mol/l);

(b) an effective amount of an auxiliary developing agent comprising a 3-pyrazolidone compound, an aminophenol or a mixture thereof;

(c) an alkali metal sulfite in an amount less than or equal to 0.32 mol/l;

(d) an alkali metal carbonate in an amount of 0.1 to 0.4 mol/l;

(e) an alkali metal hydroxide in an amount of from 0.08 to 2.0 mols/l;

(f) with the developer composition having a pH of 11.8 or higher at 25° C.; and (g) the developer composition does not contain an alkanolamine or contains an alkanolamine in an amount of less than 5 g/l; where the developer composition is useful for processing standard rapid access films while showing an especially advantageous effect in the processing of silver halide emulsions containing a hydrazine compound to achieve lith quality, and high dot quality in a stable development solution.

19 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | | |
|---|---|---|---|---|
| 4,740,452 | A | 4/1988 | Okutsu et al. | 430/439 |
| 4,740,453 | A | 4/1988 | Nakamura et al. | 430/505 |
| 4,839,259 | A | 6/1989 | Sasaoka et al. | 430/264 |
| 4,975,354 | A | 12/1990 | Machonkin et al. | 430/264 |
| 4,988,604 | A | 1/1991 | Machonkin et al. | 430/264 |
| 4,997,743 | A | 3/1991 | Sasaoka et al. | 430/264 |
| 5,196,298 | A | 3/1993 | Meeus et al. | 430/440 |
| 5,206,123 | A | 4/1993 | Ooms et al. | 430/264 |
| 5,236,816 | A | 8/1993 | Purol et al. | 430/492 |
| 5,503,966 | A | 4/1996 | Adae-Amoakoh et al. | 430/492 |

OTHER PUBLICATIONS

Abstract (Index Medicus), R. A. Stinson et al, *Biochim Biophys Acta*, 913 (3), p. 272–278 (1987).

Material Safety Data Sheet for N–butyldiethanolamine (Product # 19880), Aldrich Chemical Co. Nov. 1993.

Material Safety Data Sheet for 3–diethylamino–1–2–propane–diol (Product # D5017), Aldrich Chemical Co. Nov. 1993.

Material Safety Data Sheet for Hydroquinone (Pproduct # 53960), Aldrich Chemical Co. Nov. 1993.

The Theory of the Photographic Process, 3rd Edition, The Macmillan Co., p. 369–370 (1966).

Photographic Processing Chemistry, by L.F.A. Mason, Focal Press Ltd., p. 43–44 (1979).

Gary K. Whitmyre, "Comparative Acute Toxicities of Two Photographic Developer Formulations" dated Jul. 6, 1994, and credentials of Mr. Whitmyre.

NON-HYDROQUINONE PHOTOGRAPHIC DEVELOPER COMPOSITION WITH LITH QUALITY AND ITS METHOD OF USAGE

CROSS REFERENCE TO RELATED APPLICATIONS

This is a continuation-in-part of application Ser. No. 08/078,024 filed June 18, 1993, now abandoned.

FIELD OF THE INVENTION

This invention relates to a non-hydroquinone developer composition and its method of usage in development of photographic elements. More specifically, this invention relates to a non-hydroquinone developer composition which is particularly useful in the development of various types of photographic black-and-white photographic elements to assuredly achieve a lith quality development without the need for the presence of toxic hydroquinone. Even more particularly, the photographic developing composition of the present invention is advantageously used to develop internally boosted silver halide emulsions containing a hydrazine compound functioning as a nucleating agent.

BACKGROUND OF THE INVENTION

High contrast development of black-and-white lithographicfilms has been accomplished for a number of years using special developers which are referred to in the field as "lith" developers. As explained in U.S. Pat. No. 4,988,604, in conventional "lith" developers, high contrast is achieved using the "lith effect", also referred to as infectious development, as described by J.A.Z. Yule in the *Journal of the Franklin Institute*, vol. 239, 221–230, (145). The traditional "lith developers" are characterized by the presence of hydroquinone as the sole developer and a low sulfite ion concentration so as not to impede the infectious development mechanism. However, the conventional "lith" developers suffer from a number of recognized serious deficiencies which encumber their utility. For instance, the developer exhibits low capacity as a result of the fact that it contains hydroquinone as the sole developing agent and, further, aldehyde tends to react with the hydroquinone developer to cause undesirable changes in development activity. Further, the low sulfite ion concentration is inadequate to provide effective protection against aerial oxidation. As a consequence, the conventional "lith" developer solution is lacking in stability.

One known alternative to the use of conventional "lith" developers is disclosed in U.S. Pat. No. 4,269,929. This patent describes high contrast development of photographic elements as performed in the presence of a hydrazine compound with an aqueous alkaline developing solution, which has a pH of about 10 and below 12 and contains a dihydroxybenzene developing agent, a 3-pyrazolidone developing agent, a sulfite preservative, and a contrast-promoting amount of an amino compound as a "booster".

While such an amino "booster" containing developing composition yielded improvements in capacity, stability, and contrast, among other things, the inherent disadvantages of incorporating amino compounds as "boosters" in developing compositions soon became recognized in the prior art, such as toxicity, excessive volatility, lack of solubility, cost, and so forth, as explained in U.S. Pat. No. 4,988,604.

Accordingly, another proposal has emerged in the field which involves incorporating the amino (booster) compound into the silver halide photographic element itself, so that the amino compound is utilized as a so-called "incorporated booster", such as described in U.S. Pat. No. 4,914,003. In such "incorporated booster" systems, the amino compounds which function as "boosters" and also hydrazine compounds which function as "nucleators" are incorporated into a silver halide emulsion, or other hydrophilic colloidal layers, in the silver halide photographic element to provide a so-called "internally boosted" emulsion or one containing a hydrazine compound. For example, in this regard, representative literature includes U.S. Pat. Nos. 4,988,604, 4,975,354 and 4,994,365 and World Patents WO 92/15042 and WO 93/02389.

Also, a more recent discussion and overview of internally boosted emulsion technology is described by a publication by D.L. Kerr, entitled "AN ENVIRONMENTALLY IMPROVED NUCLEATION PROCESS FOR GRAPHIC ARTS IMAGING", IS&T's 46th Ann. Conf. (1993), pp. 268–270.

However, these prior art systems still relied, at least preferably, on the use of hydroquinone-based developing agents and as preferably used in a pH range of about 9 to about 10.8, such as explained in U.S. Pat. No. 4,988,604.

However, serious disadvantages from an ecological and toxicological standpoint are associated with the use of such hydroquinone-based developing systems. For example, hydroquinone has allergenic effects. Therefore, the use of hydroquinone poses certain handling and disposal problems in view of applicable health, safety and environment guidelines and regulations.

WO 93/11456 describes a rapid access developer for hydrazine-containing films comprising at least one alkanolamine in an amount of 5–50 g/l; at least one ascorbic acid developing agent; and having a pH in the range of 10.7 to about 12.0. The developer may further contain KOH and potassium carbonate. However, as discussed below, many alkanolamines possess the undesirable characteristic of toxicity, excessive volatility and unpleasant odor. Furthermore, alkanolamines tend to adversely affect high contrast lith image performance.

EP 603586 discloses a concentrated developer containing an ascorbic acid type compound, a 3-pyrazolidone auxiliary developing agent and at least one basic compound selected from an alkali metal carbonate, sulfite or hydroxide. The combined use of a carbonate and sulfite is preferred. The pH of a working strength developer is within the range of 9.0 to 11.0.

U.S. Pat. No. 5,196,298, which corresponds to European Patent Application No. 0 498 968 published Aug. 19, 1992, proposes a photographic developing solution for immersion development having a pH of at least 12.0 and containing more than 0.4 mols/liter of a sugar derivative, or an alkali metal salt thereof, such as l-ascorbic acid and iso-ascorbic acid, which preferably contains no other developing agents and no sulfite ions. The developer solution of U.S. Pat. No. 5,1 96,298 is described as permitting the development of graphic arts photographic materials with lith quality while permitting the disposal of the depleted developer solutions in a more environmentally ready manner.

U.S. Pat. No. 5,098,819 also discloses a non-hydroquinone and non-alkali metal hydroxide containing photographic developer composition. The non-hydroquinone developer solution of this patent contains a developer selected from ascorbic acid and sugar-type derivatives thereof, together with a sulfite, an alkali metal carbonate and a 3-pyrazolidone developer compound, wherein the developer solution has a pH range of 9.75 to 10.6. The U.S.

Pat. No. 5,098,819 describes the developer composition as being subject to degradation at pH's in excess of about 10.6. Likewise, Japanese Published Patent Application No. 59-191035 published Oct. 30, 1984, discloses a developer composition, which is especially adapted for processing a silver halide emulsion containing a black dye, wherein the developer is described as containing ascorbic acid, alkali metal carbonate, alkali metal sulfite and alkali hydroxide in a pH range of 10 to 14. However, these two latter-mentioned publications do not describe lith developers in particular, nor do these publications describe testing data which shows lith quality development.

However, in these patent specifications, there is no disclosure or suggestion that these developers can be used as developers for a silver halide photographic material containing a hydrazine compound as a nucleator to obtain a high contrast image.

In actuality, these above-mentioned non-hydroquinone photographic developer solutions do not permit the attainment of lith quality.

Therefore, the art has urgently awaited the discovery of a developer composition which does not require a hydroquinone developing agent, minimizes the need for other toxic chemicals such as alkanolamines, while concomitantly enabling the attainment of lith quality.

SUMMARY OF THE INVENTION

An object of the present invention is to provide a developer composition which does not require the presence of hydroquinone-type developer components or alkanolamines, and as a consequence, poses less of a threat to health and environment and can be more easily handled and disposed.

It is also an object of the present invention to provide a stable developer composition which is adaptable for processing standard rapid access films.

It is another object of the present invention to provide a new method for obtaining a high contrast image by using a non-hydroquinone containing developer and a silver halide photographic material containing a hydrazine compound as a nucleator.

These and other objects of the present invention can be obtained by a non-hydroquinone developer composition consisting essentially of the following:

(a) a developer selected from the group consisting of ascorbic acid and sugar-type derivatives thereof, or alkali metal salts and mixtures thereof, in an amount of 0.1 to 0.4 mol/liter (mol/l);

(b) an effective amount of an auxiliary developer comprising a 3-pyrazolidone compound, an aminophenol compound or a mixture thereof;

(c) an alkali metal sulfite in an amount of less than or equal to 0.32 mol/l;

(d) an alkali metal carbonate in an amount of 0.1 to 0.4 mol/l;

(e) an alkali metal hydroxide in an amount of from 0.08 to 2.0 mols/l;

(f) with the developer composition having a pH of 11.8 or higher at 25° C.; and (g) said developer composition does not contain an alkanolamine or contains an alkanolamine in an amount of less than 5 g/l.

In a preferred embodiment of the present invention, the developer composition additionally contains one or more of the following additional components:

(h) a restrainer to retard the development of non-exposed silver halide present in an amount of from 0.008 to 0.5 mol/l;

(i) an organic antifoggant agent in an amount of 0.02 to 2 g/l; and (j) a sequestering or chelating agent in an amount of 0.5 to 3 g/l In accordance with a more preferred embodiment of the present invention, at the same time, the restrainer is selected to be an alkali metal bromide; the organic anti-fogging agent is selected to be a combination of 0.01 to 0.1 g/l benzotriazole and 0.01 to 0.1 g/l phenyl mercaptotetrazole (PMT); and the sequestering or chelating agent is selected to be $Na_2EDTA$.

The developer composition of the present invention does not contain an alkanolamine or contains an alkanolamine in an amount of less than 5 g/l. Most preferably, the developer composition does not contain an alkanolamine. Many alkanolamines possess the undesirable characteristics of toxicity, excessive volatility and unpleasant odor. Many alkanolamines can form azeotropes with water that can complicate accurate replenishment of developer solutions, and such compounds are also quite costly. Furthermore, alkanolamines tend to accelerate the process of chemical development at the expense of physical development. This phenomenon tends to produce an image which is more grainy than an image obtained without an alkanolamine, and is contrary to the goal of obtaining a very high contrast lith image.

The use of the developer composition of the present invention has been found to unexpectedly provide for the attainment of lith quality in an assured manner and therefore high dot quality without the need for the presence of hydroquinone or an alkanolamine.

Another embodiment of the present invention comprises developing an image-wise exposed silver halide photographic material containing a hydrazine compound as a nucleator with a developer comprising a developing agent selected from the group consisting of ascorbic acid and sugar-type derivatives thereof, or alkali salts and mixtures thereof, and substantially free from dihydroxybenzene with the term "substantially free from dihydroxybenzene" meaning the amount of the dihydroxybenzene is less than $5\times10^{-4}$ mol/l and preferably is zero. The other developer composition components described above can also be employed in combination in this method embodiment of the present invention.

BRIEF DESCRIPTIONS OF THE DRAWINGS

Figure 3A:
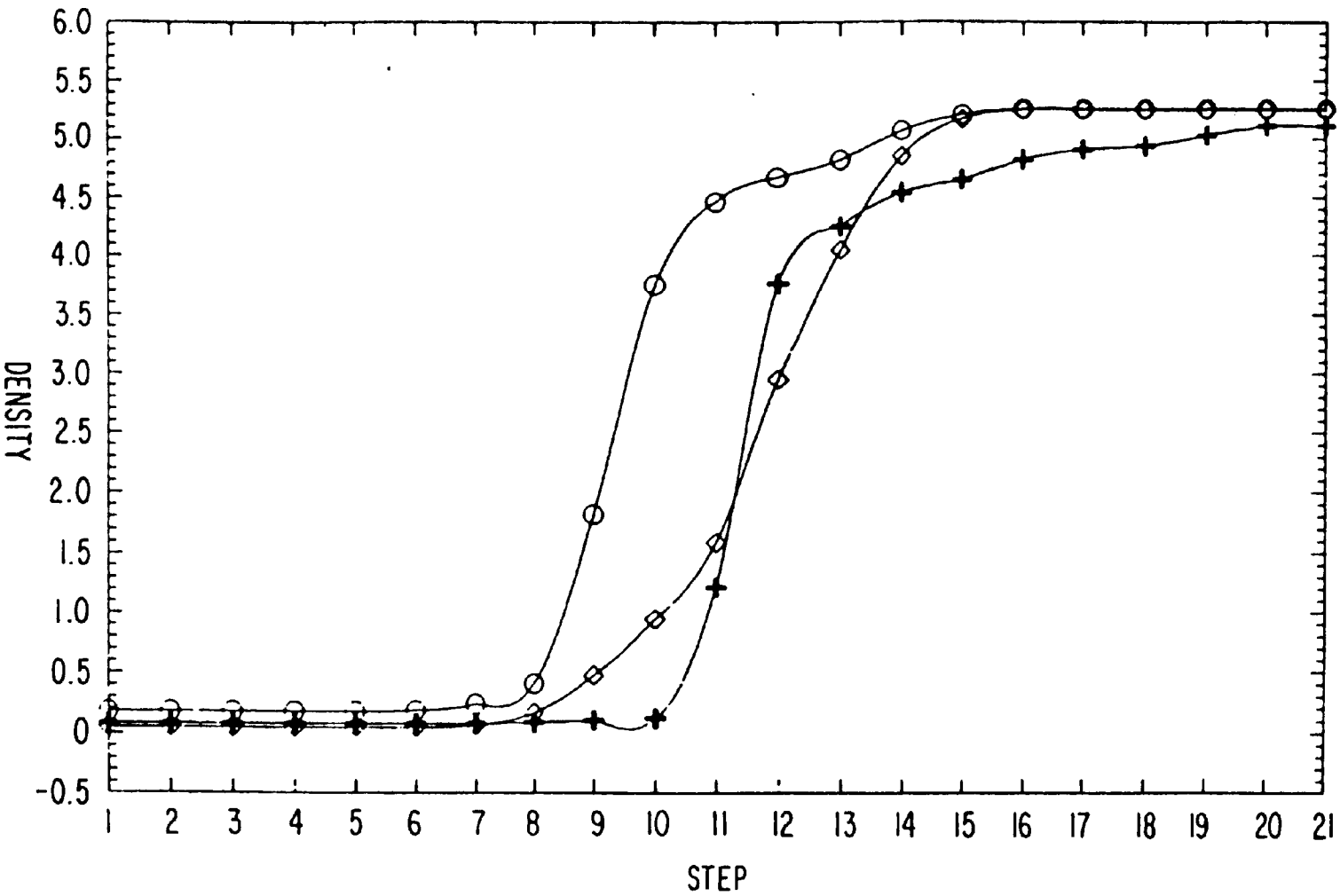

FIG. 3A shows D-LogE curves for a Fuji RO-100 conventional rapid access emulsion film developed by the developer composition of the present invention and the developer of European Patent No. 0 498 968 (U.S. Pat. No. 5,196,298).

Figure 3B:
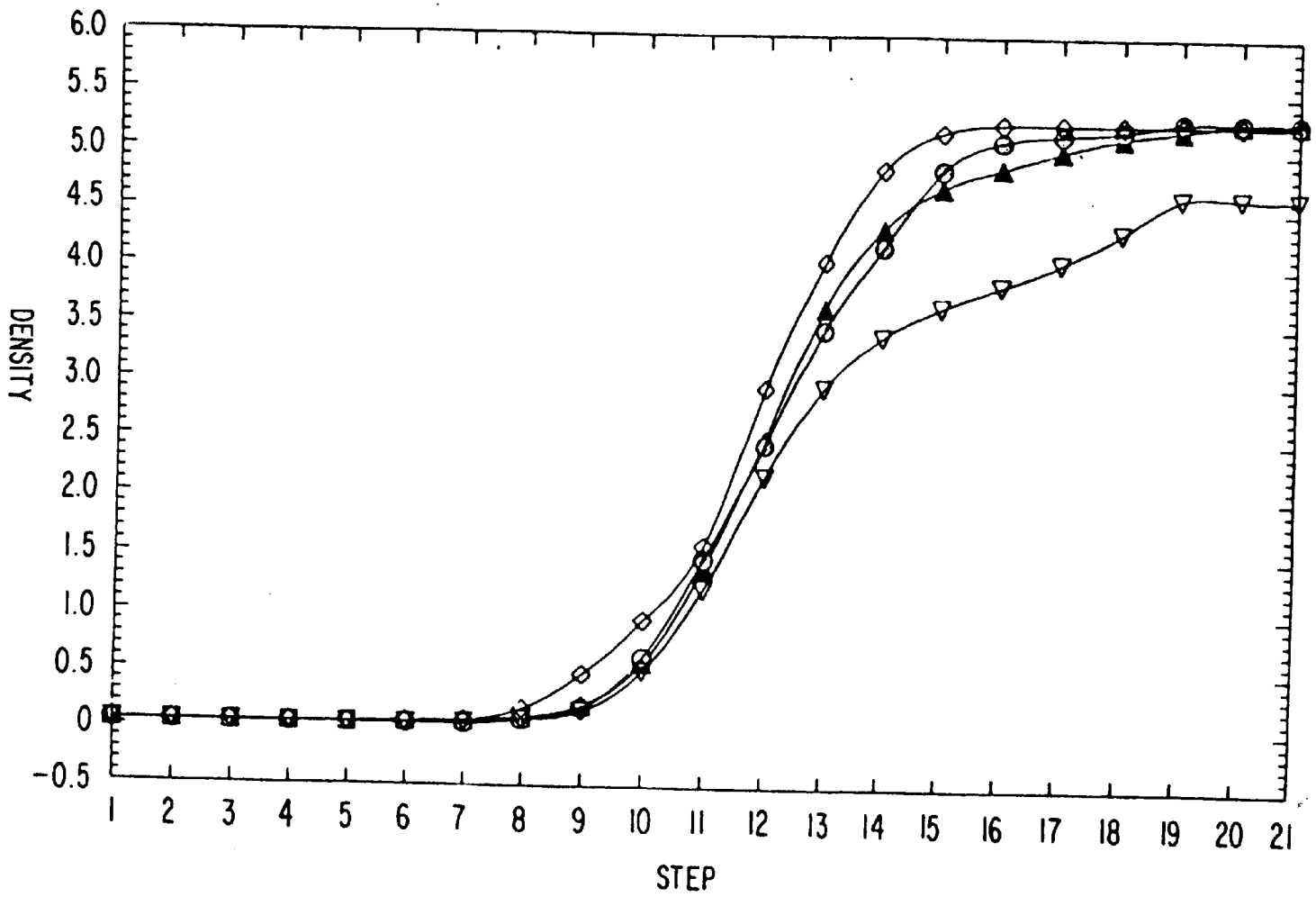

FIG. 3B shows D-LogE curves for a Fuji RO-100 conventional rapid access emulsion film developed by the developer composition of the present invention and the developer of U.S. Pat. No. 5,098,819.

Figure 3C:
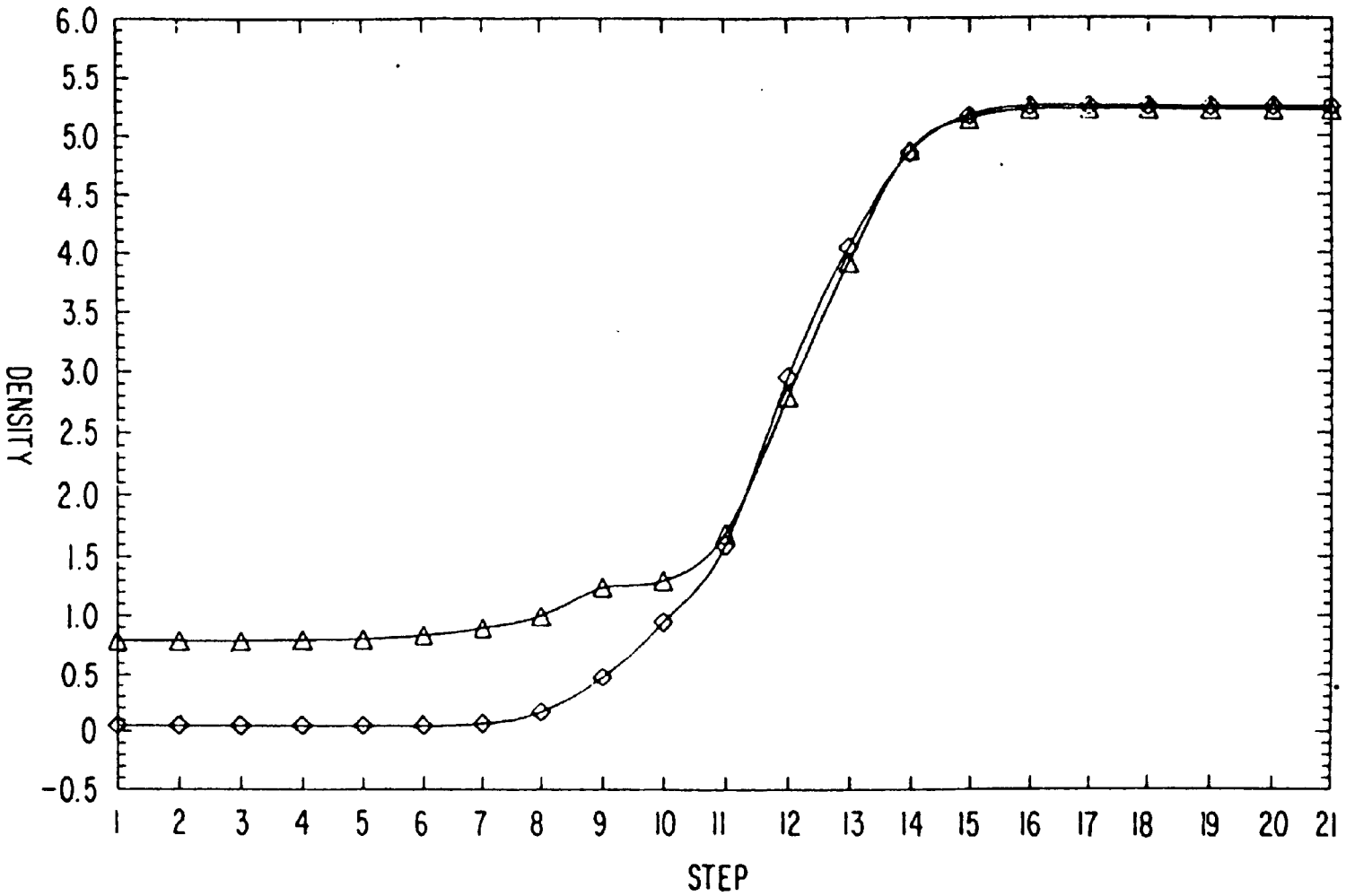

FIG. 3C shows D-LogE curves for a Fuji RO-100 conventional rapid access emulsion film developed by the developer composition of the present invention and the developer of Japanese Patent Application (OPI) No. 59-191035.

Figure 4A:
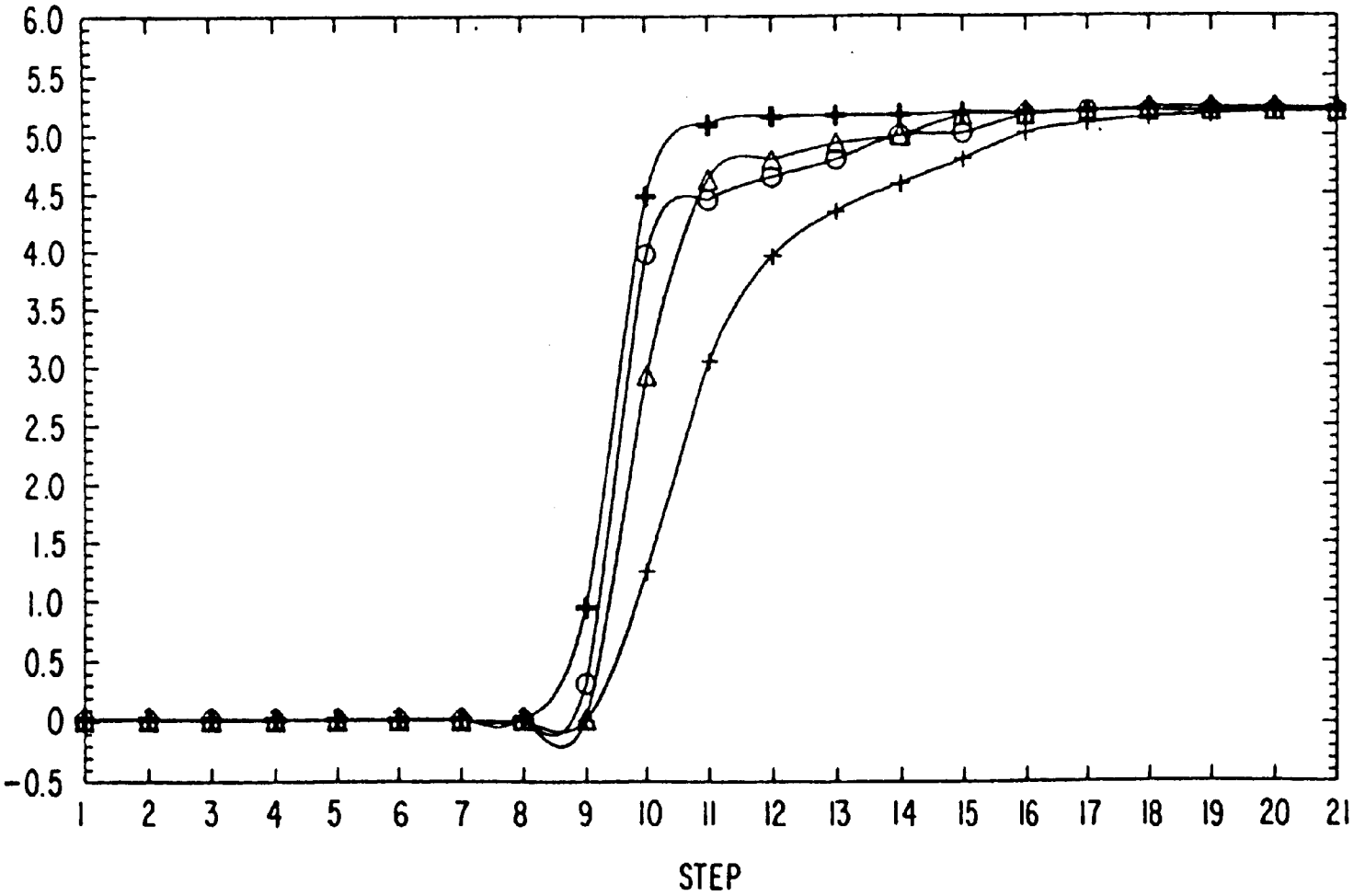

FIG. 4A shows the D-LogE curve for different formulations of the developer composition of the present invention on an EK 2000 CGP internally boosted emulsion film.

Figure 4B:
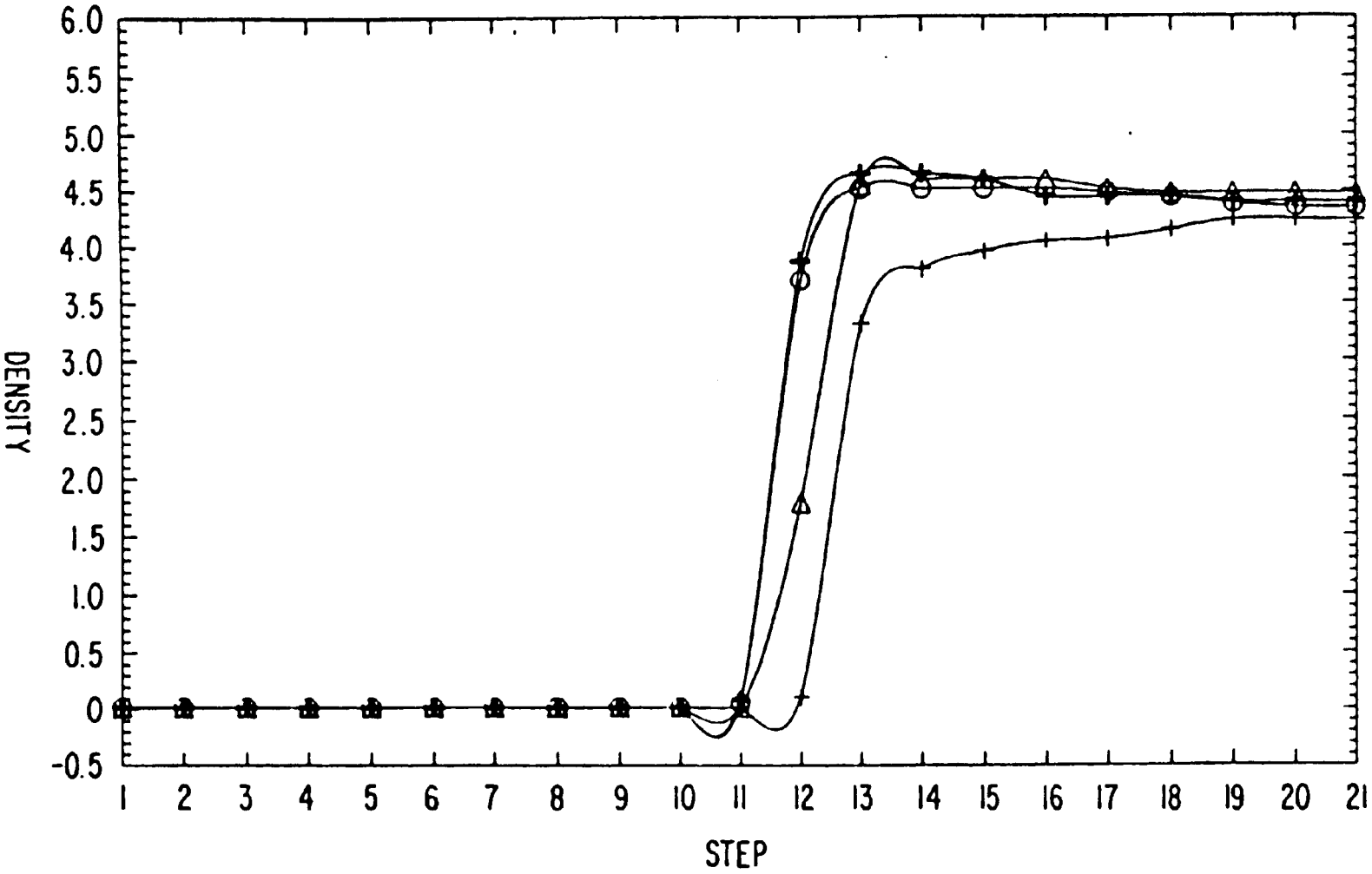

FIG. 4B shows the D-LogE curve for different formulations of the developer composition of the present invention on an EK 2000 CLW internally boosted emulsion film.

Figure 4C:
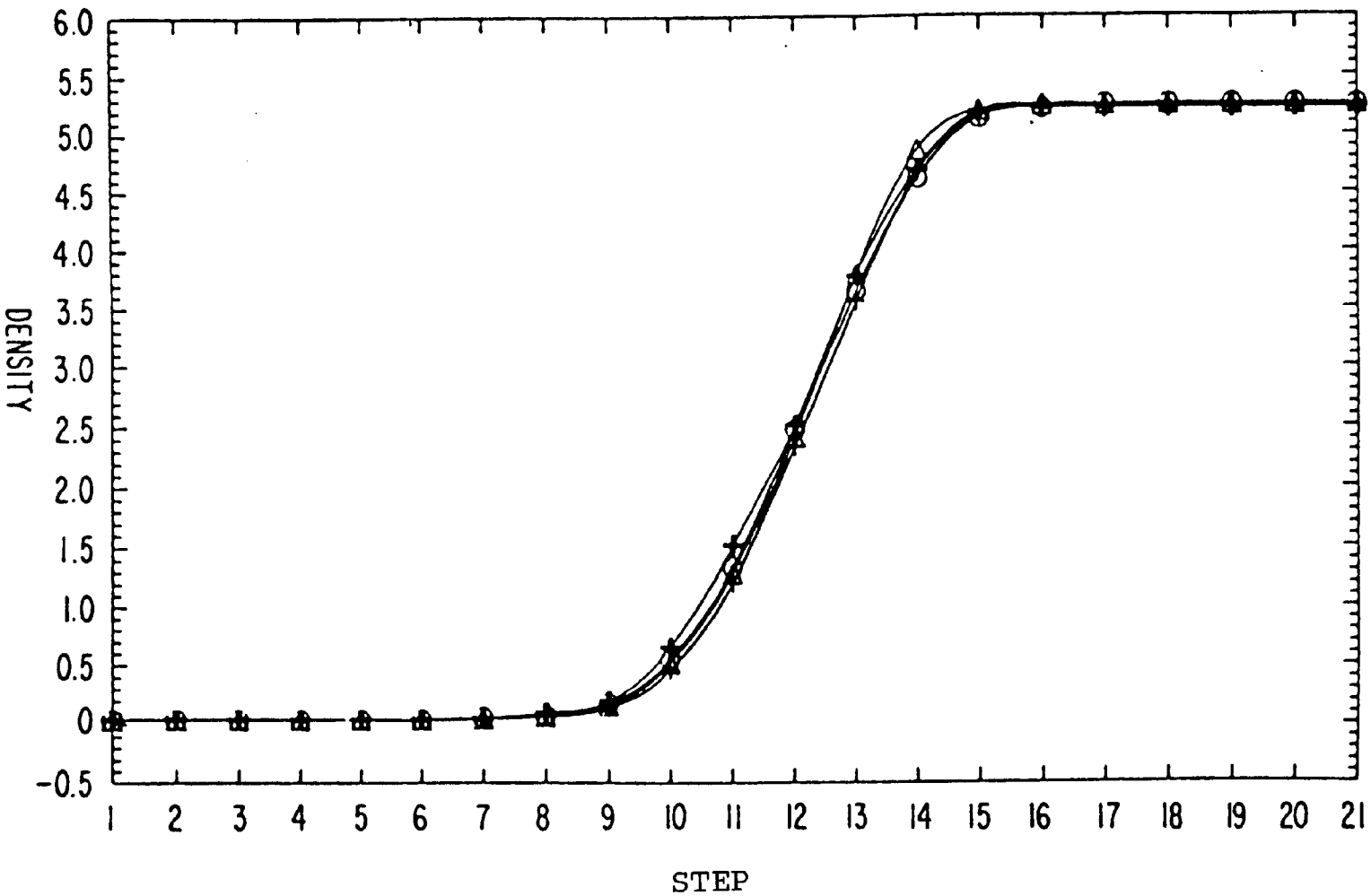

FIG. 4C shows the D-LogE curve for different formulations of the developer composition of the present invention on an Fuji RO-100 rapid access emulsion film.

Figure 5A:
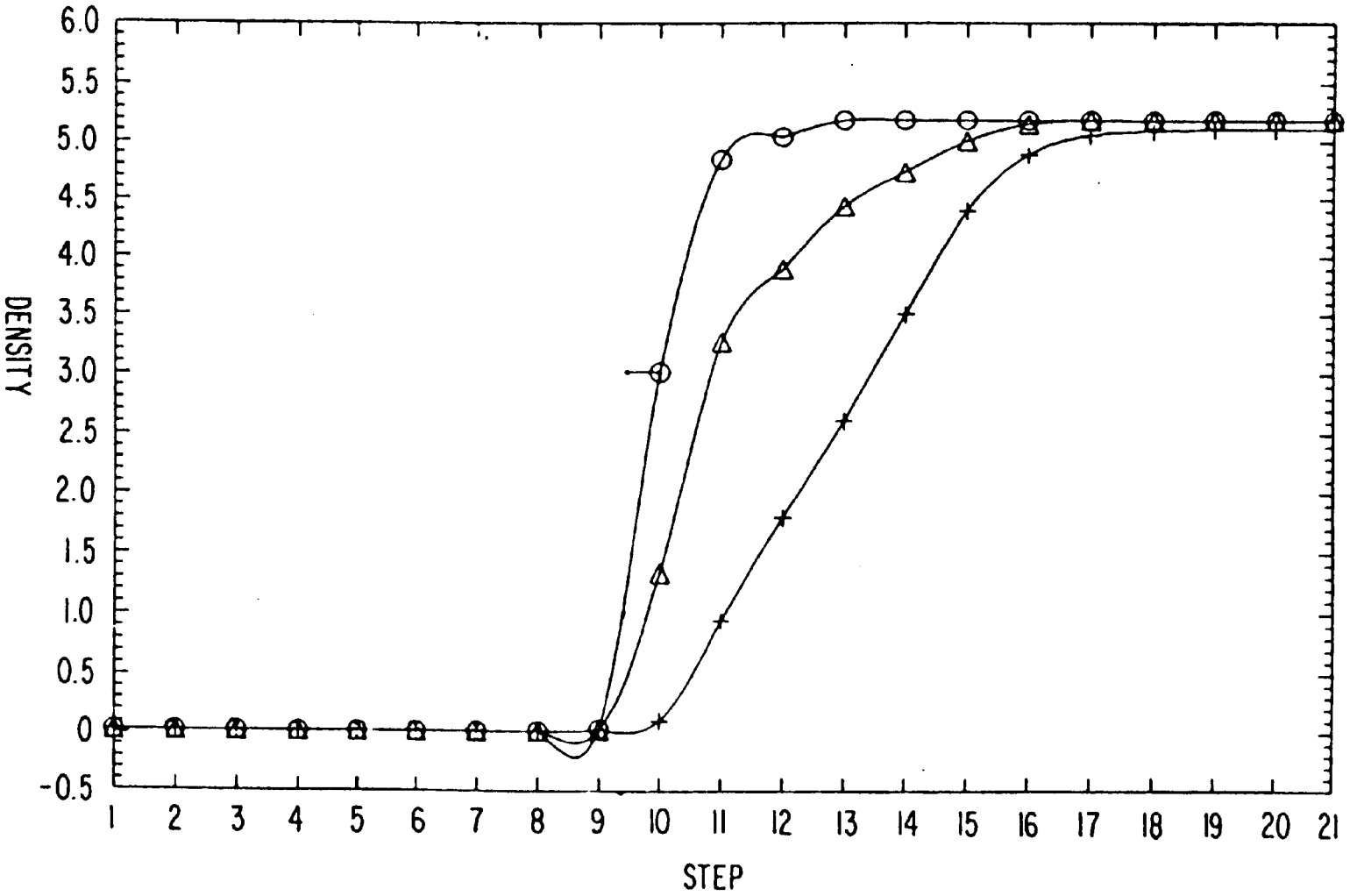

FIG. 5A shows the effect of the sodium hydroxide level, i.e., the pH value, on D-LogE curves for an EK 2000 CGP internally boosted emulsion films with an ascorbic acid-based developer formulation.

Figure 5B:
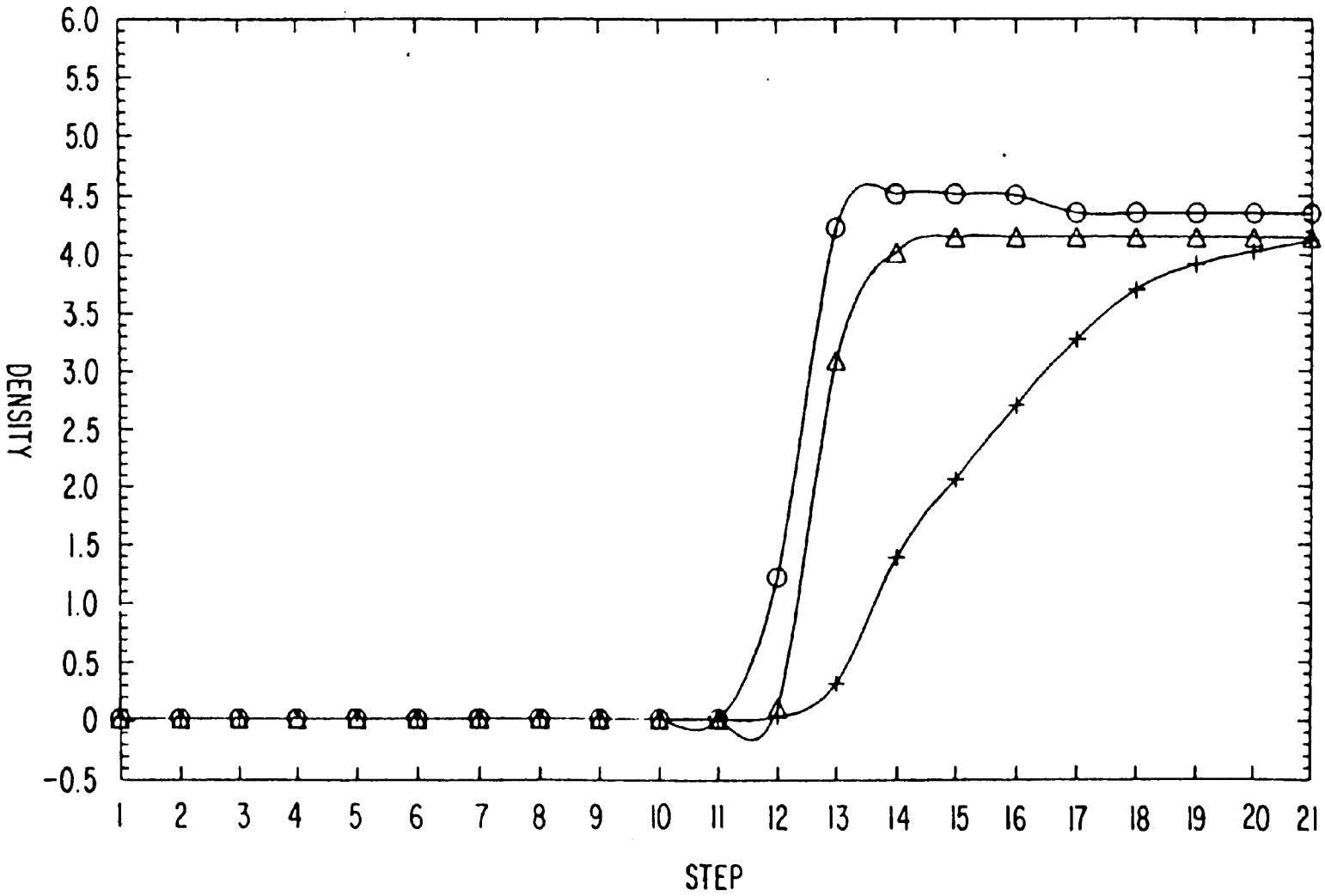

FIG. 5B shows the effect of the sodium hydroxide level, i.e., the pH value, on D-LogE curves for EK 2000 CLW internally boosted emulsion films with an ascorbic acid-based developer formulation.

Figure 5C:
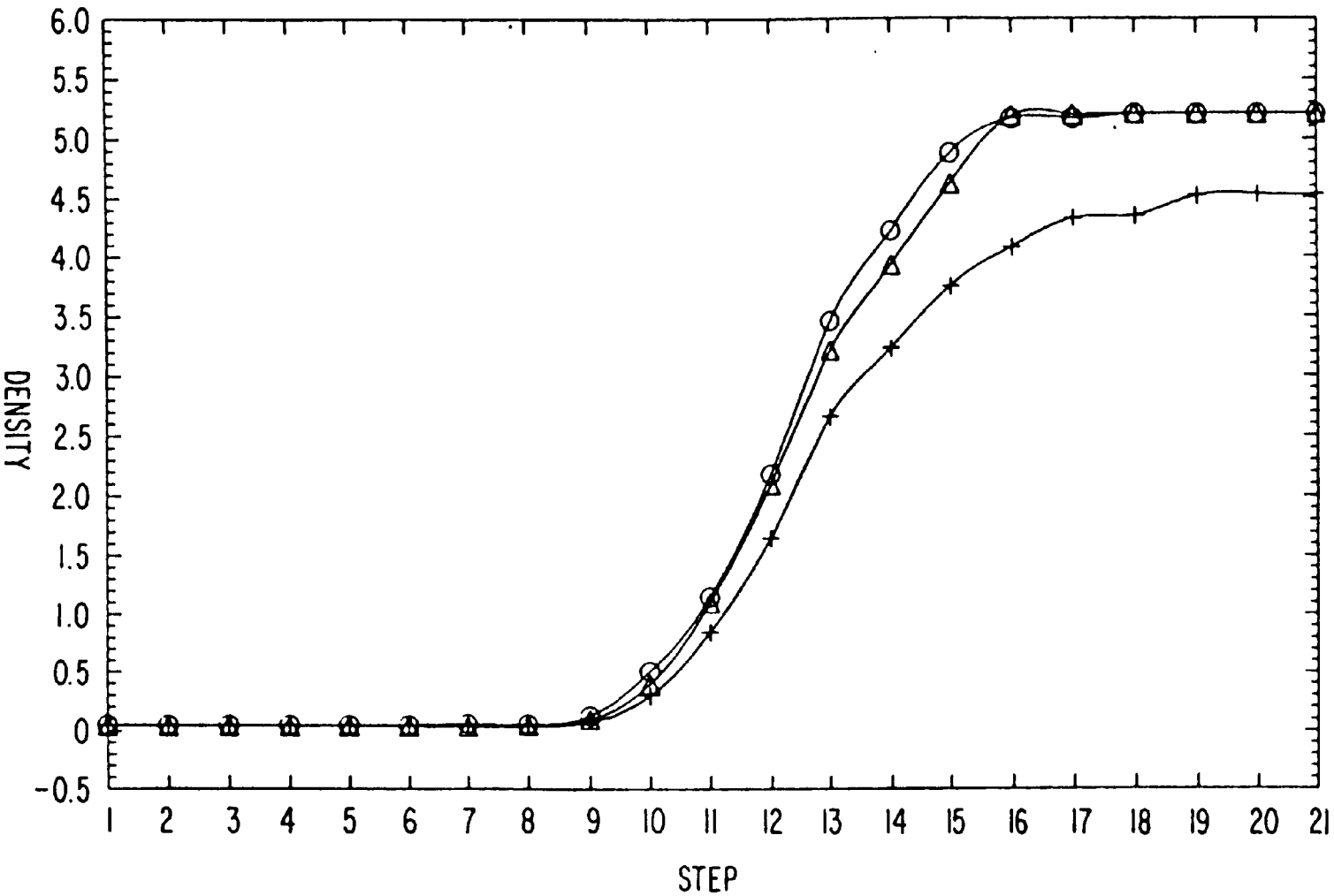

FIG. 5C shows the effect of the sodium hydroxide level, i.e., the pH value, on D-LogE curves for Fuji RO-100 rapid access emulsion films with an ascorbic acid-based developer formulation.

Figure 6:
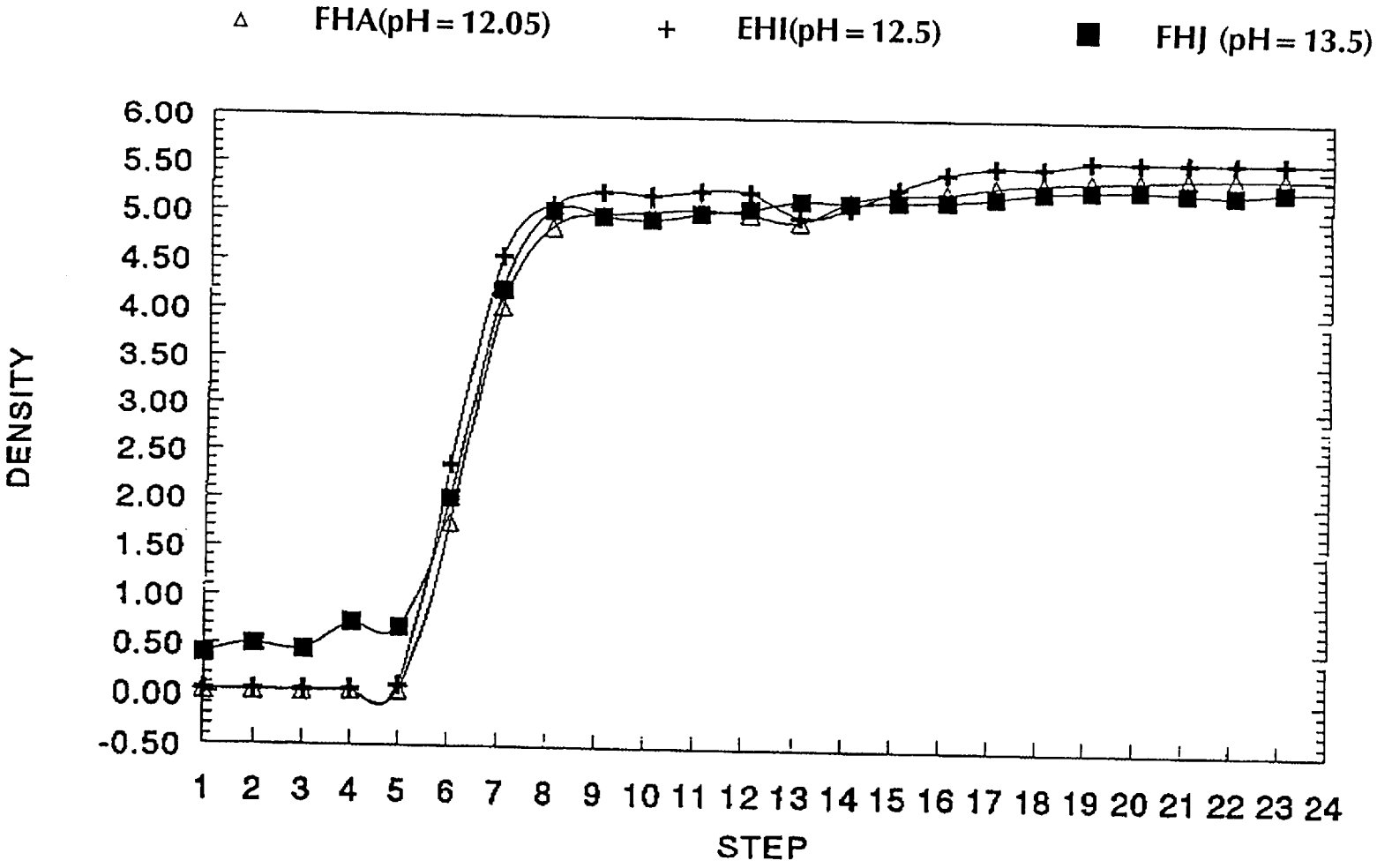

FIG. 6 shows the effect of the sodium hydroxide level, i.e., the pH valve, on D-LogE curves for an EK 2000 CGP internally boosted emulsion film with an ascorbic acid-based developer formulation.

DESCRIPTION OF THE PREFERRED EMBODIMENTS

In the developer solution of the present invention, the ascorbic acid and sugar-type derivatives thereof useable as the developing agent also include stereoisomers and diastereoisomers of ascorbic acid and its sugar-type derivatives, their salts and mixtures thereof. Suitable developers which fall within the scope of the above include, but are not limited to include, l-ascorbic acid, d-erythro-ascorbic acid (i.e., erythorbic or isoascorbic acid), d-gluco-ascorbic acid, 6-deoxy-l-ascorbic acid, l-rhamno-ascorbic acid, l-fucoascorbic acid, d-glucohepto-ascorbic acid, sorboascorbic acid, imino-l-ascorbic acid, ω-lactoascorbic acid, maltoascorbic acid,-araboascorbic acid, l-glucoascorbic acid, d-galactoacsorbic acid, l-guloascorbic acid, and l-alloascorbic acid.

The ascorbic acids and ascorbic acid sugar derivatives of this invention, including the alkali metal salts thereof, are generally used in amount ranging from 0.1 to 0.4 mol/l, or more, and preferably used in an amount ranging from 0.14 to 0.28 mol/l in the working developer solution. While the useful range of developer includes 0.1 to 0.4 mol/l, the useful amounts of developer can even exceed 0.4 mol/l in some circumstances, which generally will decrease the amount of auxiliary developer, such as phenidone that is needed. Preferred ascorbic acid compounds for use in the present invention as the developing agent are alkali metal ascorbates and l-ascorbic acid.

The ascorbic acids and ascorbic acid sugar derivatives of the present invention can be dissolved into the developing solution in the free acid form or, alternatively, they can be incorporated as an alkali salt, preferably the sodium or potassium salt thereof, or as a mixture of both free acid form and salt thereof. In the case of the use of the salt form of the developer, a lesser amount of alkali metal hydroxide is needed to establish a pH of 11.8 or higher. On the other hand, if the free acid form of the sugar is used alone, a larger amount of alkali metal hydroxide is usually employed to adjust the pH to 11.8 or higher. Other examples of useable ascorbic acid and sugar-type derivatives useable as the developing agent for the developing solution of the present invention are described in U.S. Pat. Nos. 5,098,819 and 5,196,298, with the disclosures of which being incorporated by reference herein.

An auxiliary developing agent comprising a 3-pyrazolidone (or derivative thereof, an aminophenol compound or a mixture thereof is also included in the developer solution of the present invention in order to enhance the speed of the development of the developer composition. Useable 3-pyrazolidone developing agents are disclosed, for example, in U.S. Pat. No. 5,098,819, the disclosure of which is incorporated by reference with 1-phenyl-3-pyrazolidone (also known as phenidone) being preferred. Suitable aminophenols which can be used include p-methylaminophenol (metol) and those disclosed in U.S. Pat. No. 4,914,003, the disclosure of which is incorporated by reference. The auxiliary developing agent is used in an effective amount to achieve high density and high contrast. Such is generally used in an amount of from 0.001 to 0.12 mol/l, and preferably is used in an amount of from 0.001 to 0.006 mol/l for the 3-pyrazolidone or 0.001 to 0.02 mol/l for the p-aminophenol.

The developer composition of the present invention can be successfully employed without the need of any hydroquinone-type developer or an alkanolamine. However, other important addenda to the developer composition of the present invention include an alkali metal sulfite, preferably sodium sulfite ($Na_2SO_3$) used in an amount of up to 0.32 mol/l, preferably from 5 to 30 g/l (where $Na_2SO_3$ is used), as a preservative and stabilizer against aerial oxidation. Other useable sulfites are disclosed in U.S. Pat. No. 5,098,819, which is incorporated by reference.

The full benefits of this invention when processing hydrazine- containing internally boosted films such as EK 2000 CGP type film are obtained in a pH range of 11.8 or higher at 25° C. or in a pH range of 12.05 or higher at 25° C., preferably in a pH range of from 11.8 to 14.0 at 25° C. or in a pH range of from 12.05 to 14.0 at 25° C., more preferably in a pH range of from 11.8 to 13.5 at 25° C. or in a pH range of from 12.05 to 13.5 at 25° C., and particularly preferably in a pH range of from 11.8 to 12.5 at 25° C. or in a pH range of from 12.05 to 12.5 at 25° C. In further preferred embodiments of this invention, the developer composition has a pH of from 11.8 to 12.2 at 25° C. or a pH of from 12.05 to 12.2 at 25° C. or a pH of from 12.50 to 13.50 at 25° C.

On the other hand, good results are also obtained when developing standard rapid access films such as RO-100 type film which do not contain an internally boosted emulsion and nucleator compound with the developer composition of this invention at a pH of 10.3 or higher at 25° C., and preferably at a pH of 10.3 to 12.5 at 25° C.

When pH is increased while all other factors are held constant, the contrast or lith result obtained with the developer composition of this invention is accentuated. To reduce fog at higher pH values, an antifoggant may be added as described below in proportion to the increased pH.

Further, the alkalinity of the developer composition is maintained within the desired range by the presence of an alkali metal carbonate such as sodium or potassium carbonate in an amount of 0.1 to 0.4 mol/l or less, preferably from 0.14 to 0.28 mol/l. The alkali metal carbonate is preferably used in conjunction with an alkali metal hydroxide to adjust the pH to within the desired range. The amount of alkali metal hydroxide added partly depends on whether the developer is used in a free acid form or if the developer is used in salt form. The amount of the alkali metal hydroxide needed to achieve a pH of 11.8 or higher is generally from 0.08 to 2.0 mols/l of the developer composition.

In general, the alkali metal carbonates give rise to less caustic compositions than alkali metal hydroxides. However, on the other hand, alkali metal carbonates typically require greater amounts to be present to effect a pH adjustment in comparison to alkali hydroxides. With this tradeoff in mind, it is preferred in the present invention that the alkalinity of the developer solution be established through a discretionary selection of amounts for each of alkali metal carbonate and alkali hydroxide, and with refinements made to the pH preferably being made by supplemental addition of alkali metal hydroxide.

The developer composition of the present invention also can contain a wide variety of other conventional additives and addenda, which serve other various desirable functions. For instance, these additional addenda include, but are not limited to, additional developing agents other than hydroquinone, antifogging agents, buffers, sequestering agents, swelling control agents, development accelerators, and so forth.

However, in a more preferred embodiment of the present invention, the developer solution contains certain other addenda including each of a restrainer agent, an organic antifogging agent and a sequestering or chelating agent.

For example, sodium or potassium bromides are preferably included as restrainers in an amount of about 0.008 to 0.5 mol/l. Exemplary organic anti-fogging agents preferably include a combination of a benzotriazole and phenyl mercaptotetrazole each in an amount of 0.01 to 0.1 g/l, respectively. Useful benzotriazoles are disclosed, for example, in U.S. Pat. No. 4,975,354, the disclosure of which is incorporated by reference. An exemplary mercaptotetrazole is 1-phenyl-5-mercaptotetrazole.

Moreover, the present invention also encompasses the use of other antifogging agents, such as disclosed in U.S. Pat. Nos. 5,098,819 and 5,196,298, the disclosures of which are incorporated by reference.

A small amount of a sequestering or chelating agent is generally used to sequester trace amounts of metal ions present in the components or water used in formulating the developer formulation. Exemplary sequestering agents useable in the present invention are disclosed by U.S. Pat. No. 5,098,819, incorporated herein by reference, and are generally used in an amount of 0.5 to 3 g/l, preferably from 0.5 to 2.0 g/l. Preferably, the sequestering agent used in the present invention is $Na_2EDTA$ in the above amounts.

The developing solutions of the present invention can be employed to develop various types of photographic materials, especially black-and-white photographic elements including conventional rapid access films, such as Fuji RO-100 film by Fuji Photo Film Co., Ltd., as well as silver halide photographic materials containing a hydrazine compound as a nucleator, such as EK 2000 CGP and EK 2000 CLW film manufactured by Eastman Kodak Company. However, the utility of the developing solution of the present invention is not limited thereto and is understood to extend to other black-and-white materials such as radiographic recording and duplicating materials, cinematographic recording and duplicating materials and microfilm.

However, the benefits of the present invention become especially apparent when using the inventive developer solution to develop graphic arts photographic materials and silver halide photographic materials containing a hydrazine compound as a nucleator for lith quality and therefore high dot quality.

The photographic elements which can be developed by the developer's solution of the present invention can take on conventional layering schemes such as disclosed in U.S. Pat. No. 5,198,298, which is incorporated by reference herein.

Another example of films which can be used in the present invention is a silver halide photographic material containing a hydrazine compound as a nucleator. Such photographic materials are shown in, for example, U.S. Pat. Nos. 4,975,354, 4,988,604 and 4,994,365 with respect to the layer structure, the silver halide emulsion, the internal booster, and other components of the photographic material. The disclosures of these patents are incorporated by reference.

Non-limiting examples of hydrazine compounds are the following compounds:

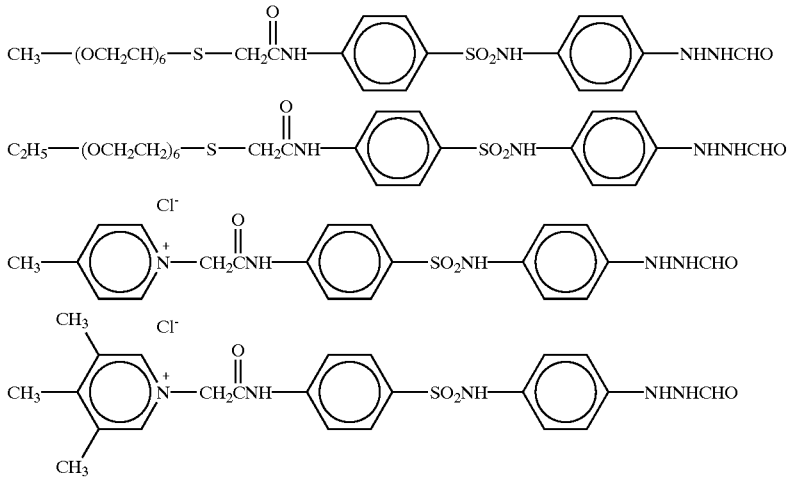

Other hydrazine compounds which can be used in the photographic material, include those described in RESEARCH DISCLOSURE, Item 23516 (November, 1983, page 346) and the literature references referred to therein, as well as in U.S. Pat. Nos. 4,080,207, 4,269,929, 4,276,364, 4,278,748, 4,385,108, 4,459,347, 4,560,638, 4,478,928, 4,737,452, 4,284,764, 4,686,167, 5,100,761, 5,006,445, 4,960,672, 4,971,890, 4,971,888, 4,950,578, 5,061,594, 5,017,456, 5,028,510, European Patent 21 7,310, European Patent 286,840 and British Patent 2,011,391. The hydrazine compound may be introduced in any hydrophilic colloid layer of the photographic material, such as a silver halide emulsion layer, an inter layer, a protective coating layer, etc.

The amount of the hydrazine compound present in the photographic material is preferably from $1\times10^{-6}$ mol to $5\times10^{-2}$ mol, especially preferably from $1\times10^{-5}$ mol to $2\times10^{-2}$ mol, per mol of silver halide in the photographic light-sensitive element.

In accordance with a preferred embodiment, developing a photographic material containing a hydrazine compound with the non-hydroquinone developer composition of this invention provides a high contrast image suitable for lith quality work having a gamma higher than 15.

The photographic material to be developed by the developing solutions of the present invention can be image-wise exposed by any convenient radiation source in accordance with this specific application.

For processing, preferably an automatically operating apparatus is used provided with a system for automatic replenishment of the processing solutions. The development step can be followed by a stop step, for example, using a stopping solution such as a 3% acetic acid solution used at approximately 90° F. for 15 seconds, followed by a fixing bath, for example, using a commercially available fixer, such a F-O-G available from Fuji Hunt Photographic Chemicals, Inc., used at about 90° F. for 30 seconds, followed by a washing or stabilization step. Finally, the photographic material is dried according to standard practices.

The following examples are illustrative of the present invention but are not to be construed as limiting thereto. All amounts are in grams per liter unless otherwise indicated.

EXAMPLES

Example 1

The photographic performance of a developer formulation representing the present invention (solution 7) was compared with examples from JP 59-191035 (solution 1), European Patent 0 498 968 (solutions 2 and 3), U.S. Pat. No. 5,098,819 (solutions 4, 5 and 6) and the commercially available Kodak RA 2000 hydroquinonedeveloper(reference solution). The various developer formulations that were evaluated are summarized in Table 1-1 below.

TABLE 1-1

| Ingredient | 1 | 2 | 3 | 4 |
|---|---|---|---|---|
| l-Ascorbic Acid | 30 | — | — | — |
| D-Sodium Ascorbate | — | 184 | 110 | 31.5 |
| Sodium Sulfite | 30 | — | — | 5.0 |
| Sodium Metabisulfite | — | — | — | — |
| Sodium Carbonate | 30 | — | — | — |
| Potassium Carbonate | — | — | — | 24.0 |
| $Na_2EDTA$ | — | — | — | — |
| $Na_4EDTA$ | — | — | — | 0.6 |
| Phenidone | 0.3 | — | — | 2.0 |
| 4-(Hydroxymethyl)-4-methyl-1-phenyl-3-pyrazolidone | — | — | — | — |
| Benzotriazole | — | — | — | 0.09 |
| 1-Phenyl-mercaptotatrazole | — | 0.08 | 0.08 | 0.008 |
| Sodium Bromide | — | — | — | 2.7 |
| Potassium Bromide | — | 25 | 25 | — |
| Sodium Hydroxide | 15.4 | — | — | — |
| Potassium Hydroxide | — | 55.6 | 45.5 | — |
| pH | 12.05 | 12.35 | 13.0 | 10.38 |

| Ingredient | 5 | 6 | 7 |
|---|---|---|---|
| l-Ascorbic Acid | — | — | 30 |
| D-Sodium Ascorbate | 79.3 | 25.5 | — |
| Sodium Sulfite | 12.5 | 2.5 | 30 |
| Sodium Metabisulfite | — | 1.9 | — |
| Sodium Carbonate | — | — | 30 |
| Potassium Carbonate | 26.4 | 24.0 | — |
| $Na_2EDTA$ | — | — | 1.0 |
| $Na_4EDTA$ | 2.3 | 0.6 | — |
| Phenidone | — | — | 0.3 |
| 4-(Hydroxymethyl)-4-methyl-1-phenyl-3-pyrazolidone | 1.04 | 2.0 | — |
| Benzotriazole | — | 0.09 | 0.02 |
| 1-Phenyl-mercaptotatrazole | — | 0.008 | 0.01 |
| Sodium Bromide | 10.0 | 2.7 | — |
| Potassium Bromide | — | — | 2.0 |
| Sodium Hydroxide | — | — | 14.5 |
| Potassium Hydroxide | — | — | — |
| pH | 10.16 | 10.04 | 12.05 |

Three different types of photographic films were developed by each developer solution tested. Two of the films were commercially available internally boosted (IB) types, namely Kodak CGP (for halftone work and Kodak CLW (for line work), while the third film was a commercially available rapid access film, namely FUJI RO-100 film.

The developing conditions used were a temperature of 90° F. and a developing time of 30 seconds for CGP and CLW films and 25 seconds for RO-100 film. Afterwards, a stop bath (3% acetic acid soln.) was used at 90° F. for 15 seconds. Then a fix bath (commercially available F-O-G fixer with hardener from Fuji Hunt Photographic Chemicals, Inc.) was used at 90° F. for 30 seconds.

The results are shown graphically in FIGS. 1, 2, 3A, 3B and 3C, wherein + represents results for Kodak RA 2000; Δ represents results for the solution 1 developer; o and + represent results for solutions 2 and 3, respectively; ▲, o, and ▽ represent results for solutions 4, 5 and 6, respectively; and ◇ represents results for solution 7 representing the present invention.

Figure 1:
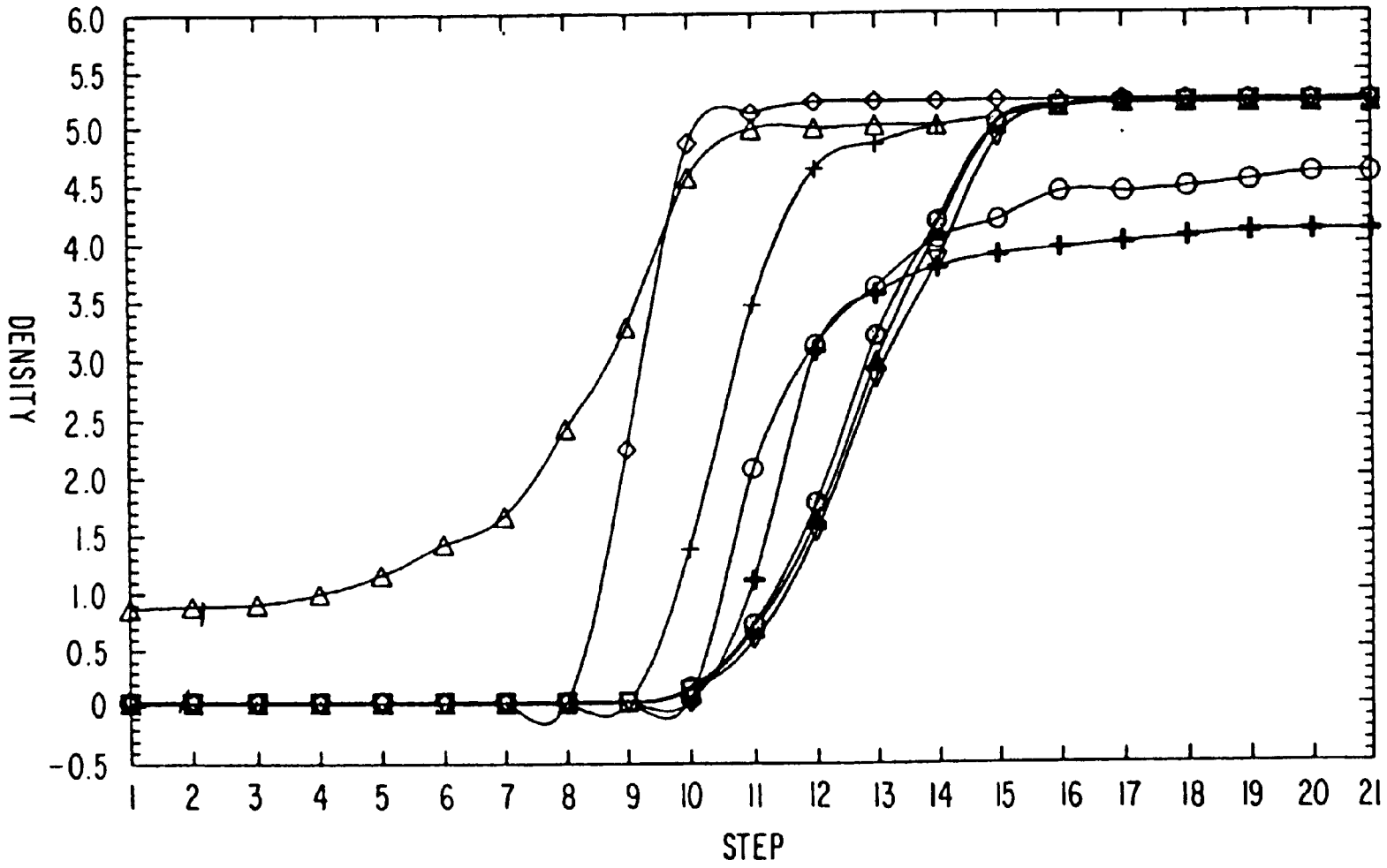
FIG. 1 shows D-LogE curves for a EK 2000 CGP internally boosted emulsion film as processed by the developer composition of the present invention and several representative prior art developer compositions.

More specifically, FIG. 1 shows D-LogE curves for a EK 2000 CGP internally boosted emulsion film as processed by the developer composition of the present invention and several representative prior art developer compositions.

Figure 2:
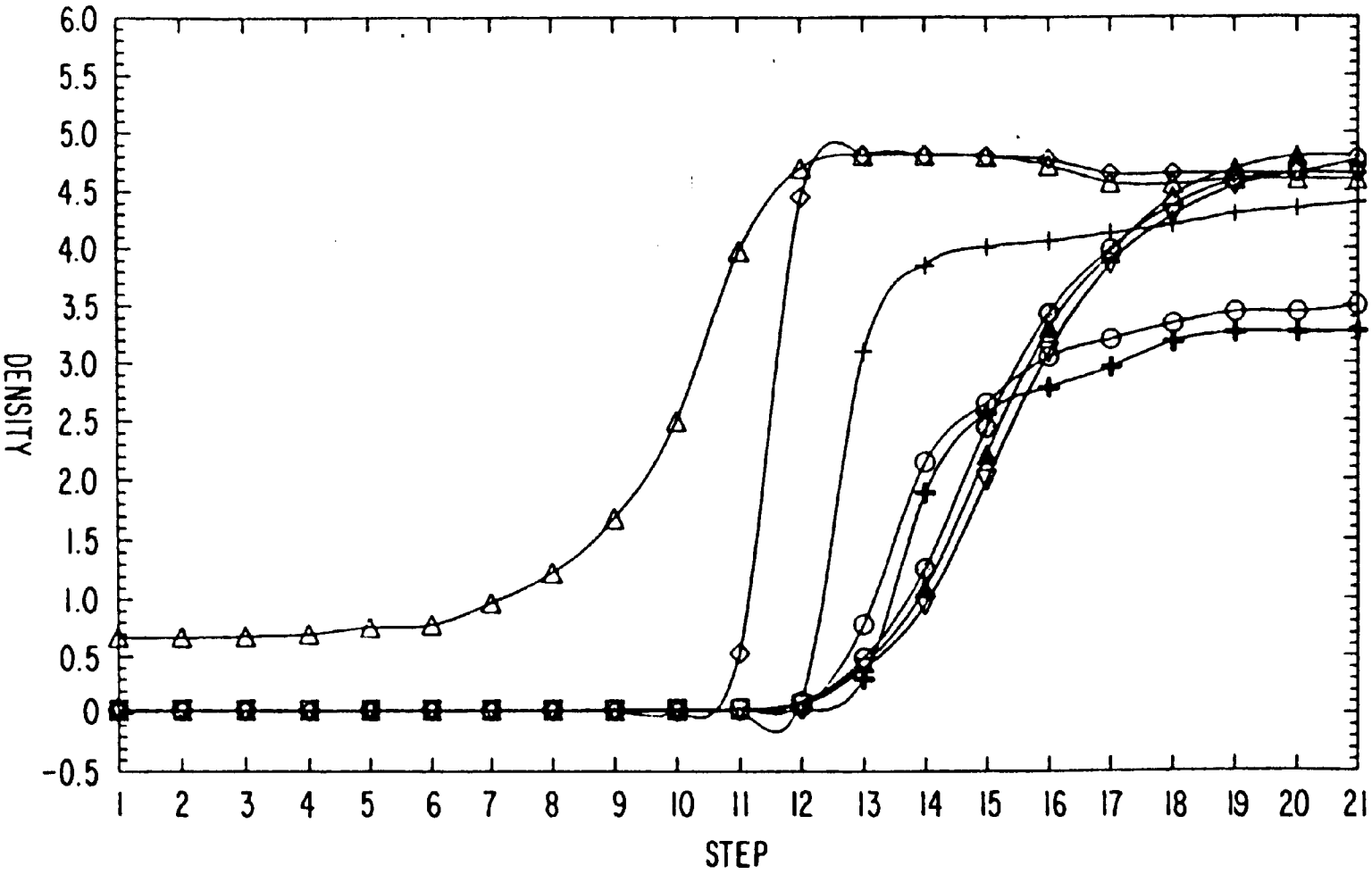
FIG. 2 shows D-LogE curves for a EK 2000 CLW internally boosted emulsion film as processed by the developer composition of the present invention and several representative prior art developer compositions.

FIG. 2 shows D-LogE curves for a EK 2000 CLW internally boosted emulsion film as processed by the developer composition of the present invention and several representative prior art developer compositions.

FIG. 3A shows D-LogE curves for a Fuji RO-100 rapid access emulsion film developed by the developer composition of the present invention and the developer of European Patent No. 0 498 968 (U.S. Pat. No. 5,196,298).

FIG. 3B shows D-LogE curves for a Fuji RO-100 rapid access emulsion film developed by the developer composition of the present invention and the developer of U.S. Pat. No. 5,098,819.

FIG. 3C shows D-LogE curves for a Fuji RO-100 rapid access emulsion film developed by the developer composition of the present invention and the developer of Japanese Patent Application (OPI) No. 59-191035.

As to the results themselves, the sharp slope in the D-LogE curves for the inventive soln. 7 in FIGS. 1 and 2 indicate lith quality for the Kodak CGP and CLW IB emulsions. This effect is truly unexpected because lith quality was not observed for the other investigated prior art non-hydroquinone developer chemistries of EP 0 498 968 (which provide high contrast on EK CGP film but the $D^{max}$ is unacceptably low) and U.S. Pat. No. 5,098,819, as indicated by the curves for solutions 1–6 in FIGS. 1 and 2. Lith quality was observed for Kodak RA 2000 developer, which is a conventional hydroquinone type developer. Yet, the soln. 7 curve is sharper than that for the Kodak RA 2000, which indicates a better performance of the Kodak emulsions with the developer composition of the present invention.

The comparative slopes in the D-LogE curve in FIG. 3 for the RO-100 standard rapid access emulsion (not hydrazine containing) shows that soln. 7 gives comparable and useful results to other ascorbic acid based chemistries. Also, high fog levels were observed for the Japanese Published Patent Application 59-191035 formulation (elevated density at low step number), as shown in FIGS. 1, 2, & 3C. Also, unsatisfactorily low densities are obtained at high step numbers for the European Patent No. 0 498 968 solutions, as shown in FIGS. 1 & 2.

Example 2

In this example, the amount of sulfite, bromide, alkali hydroxide, ascorbic acid, and pH were adjusted as shown in Table 2-1 (all amounts are in g/l, unless indicated otherwise) to evaluate and compare results for the three same type of films used in Example 1. The same developing conditions as Example 1 were used.

TABLE 2-1

| Examples | B | C | D | E |
|---|---|---|---|---|
| $Na_2CO_3$ | 30 | 30 | 30 | 30 |
| $Na_2SO_3$ | 5 | 15 | 30 | 30 |
| Phenidone | 0.3 | 0.3 | 0.3 | 0.3 |
| $Na_2EDTA$ | 1.0 | 1.0 | 1.0 | 1.0 |
| Benzotriazole | 0.02 | 0.02 | 0.02 | 0.02 |
| PMT | 0.01 | 0.01 | 0.01 | 0.01 |
| KBr | 1.0 | 2.0 | 1.0 | 4.0 |
| NaOH (97%) | 15.62 | 19.26 | 12.23 | 15.14 |
| l-Ascorbic acid | 50 | 50 | 30 | 30 |
| Deionized (DI) Water to make | 1 l | 1 l | 1 l | 1 l |
| Final pH | 10.99 | 11.49 | 11.50 | 12.18 |

The results are summarized in FIGS. 4A, 4B and 4C, wherein + represents results for Example B; Δ represents results for Example C; o represents results for Example D; and + represents results for Example E.

In general, FIG. 4A shows the D-LogE curve for different formulations of the developer composition of the present invention on an EK 2000 CGP internally boosted emulsion film.

FIG. 4B shows the D-LogE curve for different formulations of the developer composition of the present invention on an EK 2000 CLW internally boosted emulsion film.

FIG. 4C shows the D-LogE curve for different formulations of the developer composition of the present invention on an Fuji RO-100 rapid access emulsion film.

Example 3

The effect of sodium hydroxide level, and, hence the pH value, was examined for the same three types of films used in Example 1 with the formulations used in Table 3-1 (all amounts are in g/l, unless indicated otherwise). The same developing conditions were used as in Example 1.

TABLE 3-1

| Examples | F | G | H |
|---|---|---|---|
| $Na_2CO_3$ | 30 | 30 | 30 |
| $Na_2SO_3$ | 30 | 30 | 30 |
| Phenidone | 0.03 | 0.03 | 0.03 |
| $Na_2EDTA$ | 1.0 | 1.0 | 1.0 |
| Benzotriazole | 0.02 | 0.02 | 0.02 |
| PMT | 0.01 | 0.01 | 0.01 |
| KBr | 1.0 | 1.0 | 1.0 |
| D-Sodium Ascorbate | 36.8 | 36.8 | 36.8 |
| NaOH (97%) | — | 5.14 | 7.88 |
| DI Water to make | 1 l | 1 l | 1 l |
| Final pH | 10.25 | 11.29 | 12.01 |

The results are summarized in FIGS. 5A, 5B and 5C, wherein + represents the results for Example F; Δ represents the results for Example G; and o represents the results for Example H.

FIG. 5A shows the effect of the sodium hydroxide level, i.e., the pH value, on D-LogE curves for an EK 2000 CGP internally boosted emulsion films with an ascorbic acid-based developer formulation.

FIG. 5B shows the effect of the sodium hydroxide level, i.e., the pH value, on D-LogE curves for EK 2000 CLW internally boosted emulsion films with an ascorbic acid-based developer formulation.

FIG. 5C shows the effect of the sodium hydroxide level, i.e., the pH value, on D-LogE curves for Fuji RO-100 rapid access emulsion films with an ascorbic acid-based developer formulation.

The results shown in FIGS. 5A–5C demonstrate the unexpected importance of the pH value selected, especially for the internally boosted (IB) films.

Example 4

In addition to D-LogE curves, dot quality investigations also were made on the same developer formulations as solutions 1–7 and EK RA 2000 of Example 1 (Table 1-1), and on same three types of films used in Example 1. In general, dot quality is a standard methodology for evaluating the quality of lith developers. The better the lith quality, the better the dot quality. The sharper the dot, the lower the numerical rating assigned.

Dot coverage of 10, 50 and 90% of total area were used. Base fog results compare to density of low step number in the graph. D max and Gradient (Grad.) quantitative results were also examined and measured. The results of these analyses are summarized below.

TABLE 4A

SENSITOMETRIC RESULT ON THE HYDRAZINE CONTAINING EMULSION (EK CGP FILM) PROCESSED IN DIFFERENT DEVELOPERS

| EK RA 2000 | Soln. 1 | Soln. 2 | Soln. 3 | Soln. 4 | Soln. 5 | Soln. 6 | Soln. 7 |
|---|---|---|---|---|---|---|---|
| $D_{max}$ 5.20 | 5.20 | 4.60 | 4.11 | 5.21 | 5.22 | 5.21 | 5.25 |
| Grad. 12.6 | 7.2* | 13.8 | 12.6 | 7.9 | 8.3 | 7.8 | 15.7 |
| B.F. 0.02 | 0.87 | 0.04 | 0.03 | 0.03 | 0.03 | 0.03 | 0.03 |

NOTE:

Gradation (Grad.) was measured between densities 1.0 and 3.0. Grad. with * was measured between densities 1.5 and 3.0.

TABLE 4B

DOT QUALITY ON THE HYDRAZINE CONTAINING EMULSION (EK CGP FILM) PROCESSED IN DIFFERENT DEVELOPERS

| | EK RA 2000 | | | Soln. 1 | | |
|---|---|---|---|---|---|---|
| | 10% | 50% | 90% | 10% | 50% | 90% |
| RATING | 5 | 2–3 | 3–4 | NA | NA | NA |
| | Soln. 2 | | | Soln. 3 | | |
| | 10% | 50% | 90% | 10% | 50% | 90% |
| RATING | 3–4 | 2 | 3–4 | 3 | 1–2 | 3 |
| | Soln. 4 | | | Soln. 5 | | |
| | 10% | 50% | 90% | 10% | 50% | 90% |
| RATING | 6 | 6 | 7 | 6 | 6 | 7 |
| | Soln. 6 | | | Soln. 7 | | |
| | 10% | 50% | 90% | 10% | 50% | 90% |
| RATING | 6 | 6 | 7 | 2–3 | 1 | 2–3 |

NOTE: 1) DOT QUALITY RATING:

Excellent = 1, very good = 2, good = 3, fine = 4, poor = 5, very poor = 6, extremely poor = 7

2) 10%, 50%, 90% area were examined

TABLE 5A

SENSITOMETRIC RESULT ON THE HYDRAZINE CONTAINING EMULSION (EK CLW FILM) PROCESSED IN DIFFERENT DEVELOPERS

| EK RA 2000 | Soln. 1 | Soln. 2 | Soln. 3 | Soln. 4 | Soln. 5 | Soln. 6 | Soln. 7 |
|---|---|---|---|---|---|---|---|
| $D_{max}$ 4.44 | 4.60 | 4.50 | 3.27 | 4.80 | 4.77 | 4.65 | 4.65 |
| Grad. 19.9 | 5.4* | 7.0 | 6.4 | 4.8 | 5.1 | 4.6 | 26.1 |
| B.F. 0.02 | 0.87 | 0.03 | 0.03 | 0.03 | 0.03 | 0.03 | 0.02 |

NOTE:

Gradation (Grad.) was measured between densities 1.0 and 2.0. Grad. with * was measured between densities 2.0 and 3.0.

TABLE 5B

DOT QUALITY ON THE HYDRAZINE CONTAINING EMULSION (EK CLW FILM) PROCESSED IN DIFFERENT DEVELOPERS

| | EK RA 2000 | | | Soln. 1 | | |
|---|---|---|---|---|---|---|
| | 10% | 50% | 90% | 10% | 50% | 90% |
| RATING | 5 | 3 | 3 | NA | NA | NA |
| | Soln. 2 | | | Soln. 3 | | |
| | 10% | 50% | 90% | 10% | 50% | 90% |
| RATING | 5 | 2–3 | 3–4 | 4 | 2 | 3 |
| | Soln. 4 | | | Soln. 5 | | |
| | 10% | 50% | 90% | 10% | 50% | 90% |
| RATING | 6 | 6 | 7 | 6 | 6 | 7 |
| | Soln. 6 | | | Soln. 7 | | |
| | 10% | 50% | 90% | 10% | 50% | 90% |
| RATING | 6 | 6 | 7 | 2 | 1 | 1 |

NOTE: 1) DOT QUALITY RATING:

Excellent = 1, very good = 2, good = 3, fine = 4, poor = 5, very poor = 6, extremely poor = 7

2) 10%, 50%, 90% area were examined

TABLE 6A

SENSITOMETRIC RESULT ON CONVENTIONAL RAPID ACCESS EMULSION (FUJI RO-100 FILM) PROCESSED IN DIFFERENT DEVELOPERS

| EK RA 2000 | Soln. 1 | Soln. 2 | Soln. 3 | Soln. 4 | Soln. 5 | Soln. 6 | Soln. 7 |
|---|---|---|---|---|---|---|---|
| $D_{max}$ 5.31 | 5.22 | 5.26 | 5.11 | 5.29 | 5.30 | 5.20 | 5.25 |
| Grad. 8.0 | 6.0* | 11.2 | 14.8 | 7.0 | 6.3 | 5.5 | 5.6 |
| B.F. 0.04 | 0.79 | 0.18 | 0.08 | 0.05 | 0.04 | 0.04 | 0.05 |

NOTE:

Gradation (Grad.) was measured between densities 1.0 and 3.0. Grad. with * was measured between densities 1.5 and 3.0.

TABLE 6B

DOT QUALITY ON CONVENTIONAL RAPID ACCESS EMULSION (FUJI RO-100 FILM) PROCESSED IN DIFFERENT DEVELOPERS

| | EK RA 2000 | | | Soln. 1 | | |
|---|---|---|---|---|---|---|
| | 10% | 50% | 90% | 10% | 50% | 90% |
| RATING | 6 | 6 | 7 | NA | NA | NA |
| | Soln. 2 | | | Soln. 3 | | |
| | 10% | 50% | 90% | 10% | 50% | 90% |
| RATING | 5 | 2–3 | 7 | 4–5 | 3–4 | 6 |
| | Soln. 4 | | | Soln. 5 | | |
| | 10% | 50% | 90% | 10% | 50% | 90% |
| RATING | 6 | 6 | 7 | 6 | 6 | 7 |

TABLE 6B-continued

DOT QUALITY ON CONVENTIONAL RAPID ACCESS EMULSION (FUJI RO-100 FILM) PROCESSED IN DIFFERENT DEVELOPERS

| | Soln. 6 | | | Soln. 7 | | |
|---|---|---|---|---|---|---|
| | 10% | 50% | 90% | 10% | 50% | 90% |
| RATING | 6 | 6 | 7 | 6 | 5 | 4–5 |

NOTE: 1) DOT QUALITY RATING:
Excellent = 1, very good = 2, good = 3, fine = 4, poor = 5, very poor = 6, extremely poor = 7
2) 10%, 50%, 90% area were examined

TABLE 7A

SENSITOMETRIC RESULT ON THE HYDRAZINE CONTAINING EMULSION AND CURRENT RA EMULSION PROCESSED IN DIFFERENT DEVELOPERS

| | EK CGP FILM | | | |
|---|---|---|---|---|
| | Ex. B | Ex. C | Ex. D | Ex. E |
| $D_{max}$ | 5.19 | 5.20 | 5.20 | 5.23 |
| Grad. | 12.9 | 18.9 | 24.4 | 19.3 |
| B.F. | 0.02 | 0.02 | 0.02 | 0.03 |
| | EK CLW FILM | | | |
| | Ex. B | Ex. C | Ex. D | Ex. E |
| $D_{max}$ | 4.35 | 4.46 | 4.40 | 4.45 |
| Grad. | 21.5* | 15.1* | 24.8* | 25.3* |
| B.F. | 0.02 | 0.02 | 0.02 | 0.02 |
| | FUJI RO-100 FILM | | | |
| | Ex. B | Ex. C | Ex. D | Ex. E |
| $D_{max}$ | 5.25 | 5.25 | 5.25 | 5.22 |
| Grad. | 7.5 | 7.5 | 7.1 | 6.2 |
| B.F. | 0.04 | 0.04 | 0.04 | 0.04 |

NOTE:
Gradation (Grad.) was measured between densities 1.0 and 3.0. Grad. with * was measured between densities 1.0 and 2.0.

TABLE 7B

DOT QUALITY ON THE HYDRAZINE CONTAINING EMULSION (CGP & CLW) AND CONVENTIONAL RA EMULSION (RO-100) PROCESSED IN DIFFERENT DEVELOPERS

| | EK CGP FILM | | | | | |
|---|---|---|---|---|---|---|
| | Ex. B | | | Ex. C | | |
| | 10% | 50% | 90% | 10% | 50% | 90% |
| RATING | 5 | 2 | 1–2 | 3–4 | 1 | 1–2 |
| | Ex. D | | | Ex. E | | |
| | 10% | 50% | 90% | 10% | 50% | 90% |
| RATING | 3–4 | 1 | 2–3 | 2–3 | 1 | 2–3 |
| | EK CLW FILM | | | | | |
| | Ex. B | | | Ex. C | | |
| | 10% | 50% | 90% | 10% | 50% | 90% |
| RATING | 4–5 | 2–3 | 1 | 3 | 1 | 1 |

TABLE 7B-continued

DOT QUALITY ON THE HYDRAZINE CONTAINING EMULSION (CGP & CLW) AND CONVENTIONAL RA EMULSION (RO-100) PROCESSED IN DIFFERENT DEVELOPERS

| | Ex. D | | | EX. E | | |
|---|---|---|---|---|---|---|
| | 10% | 50% | 90% | 10% | 50% | 90% |
| RATING | 3 | 1 | 1 | 1 | 1 | 1–2 |
| | FUJI RO-100 FILM | | | | | |
| | Ex. B | | | Ex. C | | |
| | 10% | 50% | 90% | 10% | 50% | 90% |
| RATING | 6 | 6 | 7 | 6 | 5 | 7 |
| | Ex. D | | | Ex. E | | |
| | 10% | 50% | 90% | 10% | 50% | 90% |
| RATING | 6 | 5 | 7 | 6 | 5 | 5 |

TABLE 8A

SENSITOMETRIC RESULT ON THE HYDRAZINE CONTAINING EMULSION AND CONVENTIONAL EMULSION PROCESSED IN DIFFERENT DEVELOPERS

| | EK CGP FILM | | | EK CLW FILM | | |
|---|---|---|---|---|---|---|
| | Ex. F[1] | Ex. G[2] | Ex. H[3] | Ex. F | Ex. G | Ex. H |
| $D_{max}$ | 5.11 | 5.19 | 5.23 | 4.13 | 4.27 | 4.33 |
| Grad. | 5.2 | 11.9 | 19.9 | 4.7* | 19.9* | 17.2* |
| B.F. | 0.02 | 0.02 | 0.02 | 0.02 | 0.02 | 0.02 |
| | | | | FUJI RO-100 FILM | | |
| | | | | Ex. F | Ex. G | Ex. H |
| | | | $D_{max}$ | 4.53 | 5.21 | 5.21 |
| | | | Grad. | 5.5 | 6.8 | 7.0 |
| | | | B.F. | 0.03 | 0.04 | 0.05 |

NOTE:
Gradation (Grad.) was measured between densities 1.0 and 3.0. Grad. with * was measured between densities 1.0 and 2.0.

TABLE 8B

DOT QUALITY ON THE HYDRAZINE CONTAINING EMULSION (CGP & CLW) AND CONVENTIONAL RA EMULSION (RO-100) PROCESSED IN DIFFERENT DEVELOPERS

| EK CGP FILM | | | | | | | | | |
|---|---|---|---|---|---|---|---|---|---|
| | Ex. F | | | Ex. G | | | Ex. H | | |
| | 10% | 50% | 90% | 10% | 50% | 90% | 10% | 50% | 90% |
| RATING | 6 | 6 | 5 | 4–5 | 2–3 | 4 | 4 | 2 | 4 |
| EK CLW FILM | | | | | | | | | |
| | Ex. F | | | Ex. G | | | Ex. H | | |
| | 10% | 50% | 90% | 10% | 50% | 90% | 10% | 50% | 90% |
| RATING | 6 | 6 | 6 | 5 | 3 | 4 | 4 | 2–3 | 3–4 |

TABLE 8B-continued

DOT QUALITY ON THE HYDRAZINE CONTAINING EMULSION (CGP & CLW) AND CONVENTIONAL RA EMULSION (RO-100) PROCESSED IN DIFFERENT DEVELOPERS

FUJI RO-100 FILM

| | Ex. F | | | Ex. G | | | Ex. H | | |
|---|---|---|---|---|---|---|---|---|---|
| | 10% | 50% | 90% | 10% | 50% | 90% | 10% | 50% | 90% |
| RATING | 6 | 6 | 7 | 6 | 6 | 7 | 6 | 6 | 5 |

[1]Without NaOH, pH 10.27;
[2]With NaOH, pH 11.30;
[3]With NaOH, pH 12.00

Example 5

The effect of sodium hydroxide level spanning a pH range of 12.05 to 13.50 was examined for EK 2000 CGP film used in Example 1 with the formulations used in Table 4-1 (all amounts in g/l, unless indicated otherwise). The same developing conditions were used as in Example 1.

TABLE 4-1

| Example | A | I | J |
|---|---|---|---|
| L-Ascorbic Acid | 30 | 30 | 30 |
| Sodium Sulfite | 30 | 30 | 30 |
| Sodium Carbonate | 30 | 30 | 30 |
| 2Na-EDTA | 1.0 | 1.0 | 1.0 |
| Phenidone | 0.3 | 0.3 | 0.3 |
| Benzotriazole | 0.02 | 0.8 | 1.0 |
| 1-Phenyl-Mercaptotetrazole | 0.01 | 0.01 | 0.14 |
| Potassium Bromide | 2.0 | 4.0 | 15.0 |
| Sodium Hydroxide (98%) | 14.5 | 17.2 | 59.5 |
| pH @ 25° C. | 12.05 | 12.50 | 13.50 |

The results are summarized in FIG. 6 wherein A represents the results for Example A; + represents the results for Example 1; and ■ represents the results for Example J. FIG. 6 shows the effect of the sodium hydroxide level, i.e., the pH value, on D-LogE curves for an EK 2000 CGP internally boosted emulsion film with an ascorbic acid-based developer formulation. The steep slope demonstrates the excellent lith result obtained.

While the invention has been described in detail and with reference to the specific embodiments thereof, it will be apparent to one skilled in the art that various changes and modifications can be made thereto without departing from the spirit and scope thereof.

What is claimed is:

1. A non-hydroquinone photographic developer composition comprising:

(a) a developer selected from the group consisting of ascorbic acid and sugar-type derivatives thereof, or alkali metal salts and mixtures thereof, in an amount of 0.1 to 0.4 mol/liter (mol/l);

(b) an effective amount of an auxiliary developing agent comprising a 3-pyrazolidone compound, an aminophenol or a mixture thereof;

(c) an alkali metal sulfite in an amount less than or equal to 0.32 mol/l;

(d) an alkali metal carbonate in an amount of 0.1 to 0.4 mol/l;

(e) an alkali metal hydroxide in an amount of from 0.08 to 2.0 mols/l;

(f) with the developer composition having a pH of from 11.8 to 13.5 at 25° C.; and (g) said developer composition does not contain an alkanolamine or contains an alkanolamine in an amount of less than 5 g/l.

2. The non-hydroquinone photographic developer composition of claim 1, wherein said developer composition has a pH of from 12.05 to 13.5 at 25° C.

3. The non-hydroquinone photographic developer composition of claim 1, wherein said developer composition has a pH of from 12.5 to 13.5 at 25° C.

4. The non-hydroquinone photographic developer composition of claim 1, wherein said developer is selected from the group consisting of l-ascorbic acid, d-erythroascorbic acid, d-gluco-ascorbic acid, B-deoxy-l-ascorbic acid, l-rhamno-ascorbic acid, l-fucoascorbic acid, d-glucohepto-ascorbic acod, sorboascorbic acid, imino-l-ascorbic acid, ω-lactoascorbic acid, maltoascorbic acid, l-araboascorbic acid, l-glucoascorbic acid, d-galactoascorbic acid, l-guloascorbic acid and l-alloascorbic acid.

5. The non-hydroquinone photographic developer composition of claim 1, wherein said developer comprises an alkali metal salt of ascorbic acid.

6. The non-hydroquinone photographic developer composition of claim 1, wherein said developer composition substantially does not contain an alkanolamine.

7. The non-hydroquinone photographic developer composition of claim 1, further comprising one or more of (h) a restrainer to retard the development of non-exposed silver halide present in an amount of from 0.008 to 0.5 mol/l;

(i) an organic antifoggant agent in an amount of 0.02 to 2 g/l; and (j) a sequestering or chelating agent in an amount of 0.5 to 3 g/l.

8. The non-hydroquinone photographic developer composition of claim 7, wherein said restrainer comprises sodium bromide; said organic anti-fogging agent comprises a misture of benzotriazole and 1-phenyl-5-mercaptotetrazole; and said sequestering agent comprises $NA_2EDTA$.

9. The non-hydroquinone photographic developer composition comprising:

(a) a developer selected from the group consisting of ascorbic acid and sugar-type derivatives thereof, or alkali metal salts and mixtures thereof, in an amount of 0.1 to 0.4 mol/liter (mol/l);

(b) an effective amount of an auxiliary developing agent comprising a 3-pyrazolidone compound, an aminophenol or a mixture thereof;

(c) an alkali metal sulfite in an amount less than or equal to 0.32 mol/l;

(d) an alkali metal carbonate in an amount of 0.1 to 0.4 mol/l;

(e) an alkali metal hydroxide in an amount of from 0.08 to 2.0 mols/l;

(f) with the developer composition having a pH of from 11.8 to 13.5 at 25° C.; and (g) said developer composition does not contain an alkanolamine.

10. A method of obtaining an image comprising developing an image-wise exposed black-and-white silver halide photographic material with a non-hydroquinone developer composition comprising:

(a) a developer selected from the group consisting of ascorbic acid and sugar-type derivatives thereof, or alkali metal salts and mixtures thereof, in an amount of 0.1 to 0.4 mol/liter (mol/l);

(b) an effective amount of an auxiliary developing agent comprising a 3-pyrazolidone compound, an aminophenol or a mixture thereof;

(c) an alkali metal sulfite in an amount less than or equal to 0.32 mol/l;

(d) an alkali metal carbonate in an amount of 0.1 to 0.4 mol/l;

(e) an alkali metal hydroxide in an amount of from 0.08 to 2.0 mols/l;

(f) with the developer composition having a pH of 10.3 or higher at 25° C.; and (g) said developer composition does not contain an alkanolamine or contains an alkanolamine in an amount of less than 5 g/l, wherein said photographic material does not contain an internally boosted silver halide emulsion and nucleator compound.

11. The non-hydroquinone photographic developer composition of claim 9, wherein said developer composition has a pH of from 12.05 to 13.5 at 25° C.

12. The non-hydroquinone photographic developer composition of claim 9, wherein said developer composition has a pH of from 12.5 to 13.5 at 25° C.

13. The non-hydroquinone photographic developer composition of claim 9, wherein said developer composition comprises a developer selected from the group consisting of ascorbic acid and sugar-type derivatives thereof, or alkali metal salts and mixtures thereof, in an amount of 0.14 to 0.28 mol/liter (mol/l).

14. The non-hydroquinone photographic developer composition of claim 1, wherein said developer composition comprises a developer selected from the group consisting of ascorbic acid and sugar-type derivatives thereof, or alkali metal salts and mixtures thereof, in an amount of 0.14 to 0.28 mol/liter (mol/l).

15. The non-hydroquinone photographic developer composition of claim 1, wherein said developer composition comprises an alkali metal sulfite in an amount of from 0.04 mol/l to 0.32 mol/l.

16. The non-hydroquinone photographic developer composition of claim 1, wherein said developer composition comprises an alkali metal sulfite in an amount of from 0.04 mol/l to 0.24 mol/l.

17. the non-hydroquinone photographic developer composition of claim 9, wherein said developer composition comprises an alkali metal sulfite in an amount of from 0.04 mol/l to 0.32 mol/l.

18. The non-hydroquinone photographic developer composition of claim 9, wherein said developer composition comprises an alkali metal sulfite in an amount of from 0.04 mol/l to 0.24 mol/l.

19. A non-hydroquinone photographic developer composition consisting essentially of:

(a) a developer selected from the group consisting of ascorbic acid and sugar-type derivatives thereof, or alkali metal salts and mixtures thereof, in an amount of 0.1 to 0.4 mol/liter (mol l);

(b) an effective amount of an auxiliary developing agent comprising a 3-pyrazolidone compound, an aminophenol or a mixture thereof;

(c) an alkali metal sulfite in an amount less than or equal to 0.32 mol/l;

(d) An alkali metal carbonate selected from the group consisting of sodium carbonate and potassium carbonate in an amount of 0.1 to 0.4 mol/l;

(e) an alkali metal hydroxide in an amount needed to adjust the developer composition to a pH of from 10.3 to 12.5; and (f) with the developer composition having a pH of from 10.3 to 12.5 at 25° C.

* * * * *